Sept. 3, 1940.  E. H. PURDY  2,213,638
MIXER
Filed Aug. 11, 1939
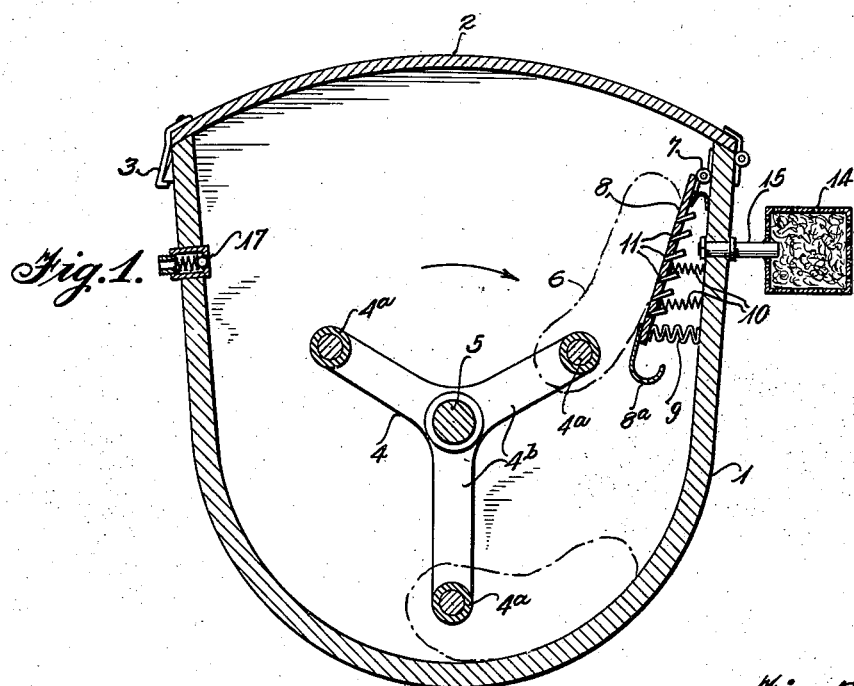
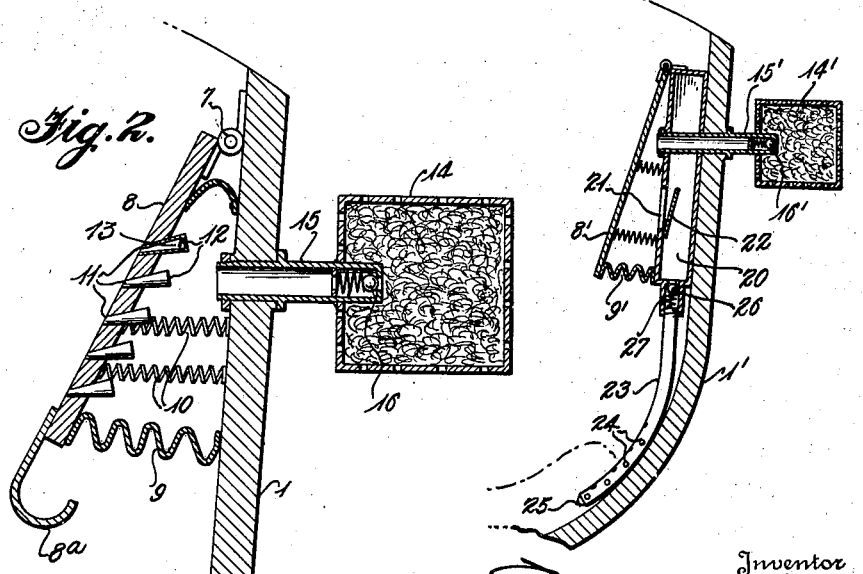
Inventor
Eugene H. Purdy Patented Sept. 3, 1940

2,213,638

UNITED STATES PATENT OFFICE 2,213,638

MIXER

Eugene H. Purdy, Washington, D. C.

Application August 11, 1939, Serial No. 289,676

15 Claims. (Cl. 107—31)

This invention relates to mixers and aims to provide means for aerating and cooling dough or other plastic material during mixing.

An important object of my invention is to provide in a mixer a pump adapted to utilize the kinetic energy of the dough as it is flung against a wall of the mixing receptacle by the agitator to force air into the dough, this pump also serving to cushion the impact of the dough against the wall of the receptacle thereby eliminating excessive noise and vibration and also reducing frictional heat which is apt to raise the temperature of the dough to an undesirable degree.

Another object of my invention is to provide means for creating a flow of clean fresh air through the mixing receptacle during mixing and, preferably, for maintaining a pressure in the receptacle slightly above atmospheric to promote the incorporation of air with the dough.

Other objects and advantages will be apparent from the following detailed description of two preferred embodiments of my invention, in which:

Figure 1 is a transverse cross-sectional view through a mixer including one form of aerating pump of the invention;

Figure 2 is an enlarged cross-sectional view of the pump shown in Fig. 1; and

Figure 3 is a transverse cross-sectional view of a modified form of aerating pump.

Referring to the mixer somewhat schematically illustrated in Fig. 1 of the drawing, a mixing receptacle 1, having a hinged cover 2 adapted to be held tightly closed against the top of the receptacle by a latch 3, encloses a rotary agitator 4. This agitator comprises a plurality of agitator bars 4a supported at the outer ends of radial arms 4b mounted upon a horizontal shaft 5 extending lengthwise through the mixing receptacle. Rotation is imparted to the shaft, by means not shown, to drive the agitator in the direction indicated by the arrow in Fig. 1.

This form of mixer is well known in the mixing art and is commonly employed for mixing and working dough and other plastic materials. During operation of the apparatus the ingredients of the mix contained in the receptacle after being thoroughly intermingled attains a cohesiveness and plasticity such that the dough tends to cling to the agitator bars, as indicated at 6, and is repeatedly flung by the agitator bars against a side of the receptacle with great force. The thumping of the dough against a wall of the mixing chamber is objectionable not only because of the resulting noise and the shocks to which the apparatus is subjected, but also because such action excessively raises the temperature of the dough due to the generation of frictional heat therein.

According to the present invention the kinetic energy of the dough as it is flung against the side of the receptacle is utilized to operate a pump for injecting air into the dough while at the same time frictional heat is reduced to a minimum by absorption of the force of the blows delivered by the dough against the side of the receptacle.

The pump for discharging air into the dough is constructed as follows: Hinged at 7 to the side of the mixing receptacle and projecting downwardly within the mixing chamber in a position to intercept the dough as it is swung downwardly against the side of the receptacle by the agitator bars, is a breaker plate 8 extending horizontally and approximately co-extensive in length with the mixing chamber. This breaker plate forms one side of a collapsible bellows 9, the other side of the bellows being constituted by the wall of the receptacle. A series of compression springs 10 normally maintains the bellows expanded.

The breaker plate, as more clearly shown in Fig. 2, is provided with a series of small apertures forming vents 11 for the expulsion of air from the bellows and these vents are disposed at a downward inclination to the outer or impact face of the plate to prevent material from entering and clogging their openings. Each vent is tapered so as to provide an aperture decreasing in size from the rear face of the plate to its outer face. Cups 12 are inserted into the vents upon the rear face of the plate and each cup is provided with a flap valve 13 so arranged as to permit the discharge of air from the bellows when the bellows is collapsed but to prevent the inflow of air when the bellows is restored under the thrust of the compression springs 10. A metal shield 8a extends over the lower edge of the breaker plate to deflect the dough downwardly into the receptacle and the extended end of this shield also acts as a flexible stop for the breaker plate.

A manifold box 14 extends parallel to the bellows upon the exterior of the mixing receptacle and communicates with the interior of the bellows through a plurality of inlet pipes 15. Each inlet pipe contains a spring-seated ball valve 16, the arrangement being such that air is allowed to flow from the manifold into the bellows but is precluded from flowing in the reverse direction. The walls of the manifold are perforated and the interior of the manifold is filled with some loose fibrous material, such as cotton, for removing dirt from the outside air passing through the manifold.

A relief valve 17 is suitably provided through a wall of the mixing receptacle. This valve is of the spring-seated ball type and is arranged to permit the escape of air from the interior of the mixer but to prevent the passage of outside air into the mixer. This valve may be adjustable so as to respond to different pressures and preferably will be set so as to maintain a pressure slightly greater than atmospheric within the mixing chamber.

The operation of the mixer just described is as follows: The ingredients to be mixed—principally flour and water in the case of bread dough—are placed within the mixing receptacle, the cover 2 closed and the shaft 5 connected to a source of power to rotate the agitator in the direction indicated by the arrow in Fig. 1. During the initial mixing stage rotation of the agitator will thoroughly mix the ingredients and the pump will remain inactive. Maintaining the pump out of operation at this stage is desirable in order to prevent blowing the dry flour about the mixing chamber and thus interfering with the mixing.

Continued operation of the agitator causes the materials to eventually attain the consistency of dough, at which time the dough will cling to the agitator bars as they sweep through the bottom of the chamber and be carried upwards and across the chamber and hurled against the breaker plate 8. The breaker plate, being yieldably mounted, serves to cushion the blow and to reduce the amount of frictional heat developed thereby. Thus, the bellows 9 will contract and expand under the intermittent impacts of dough against the breaker plate and cool, clean outside air will be pumped into the dough through the vents 11.

When the pressure of air in the receptacle builds up to slightly above atmospheric pressure, because of the air being continuously supplied to the receptacle by the pump, the relief valve 17 will open and thereafter maintain the desired pressure within the mixing chamber. This increased pressure of air within the mixing chamber thus attained promotes the incorporation of air into the dough as it is being worked by the agitator.

The fact that the mixer is closed to the atmosphere and only air which has been previously cleansed by passage through the fibrous material in the manifold is admitted to the interior of the mixer, insures that the mixing operation takes place under sanitary conditions. Furthermore, the pumping of outside air into the mixing receptacle, only a part of which is absorbed by the dough, the rest being expelled through the relief valve 17, produces a continuous flow of cool air through the mixing chamber.

In Fig. 3 is illustrated a modified form of aerating pump applied to a mixer of the type illustrated in Fig. 1. This pump comprises a breaker plate 8' overlying a bellows 9' and the other side of the bellows is closed by a windbox 20 fastened to a wall of the mixing receptacle 1' which is in communication with the bellows by a port 21 closed by a flap valve 22.

Extending downwardly from the windbox along the wall of the receptacle are a series of discharge tubes 23, (only one being shown), these tubes being either of rubber or metal. The walls of the tubes adjacent their lower ends are perforated to provide air vents 24, while the lower open ends of the tubes are constricted, as indicated at 25, so that pressure is built up within the tubes when the bellows forces air thereinto. Each tube is connected to the windbox by means of a nipple 26 forming a housing for a spring-seated ball valve 27 which allows air to pass into a tube but prevents its flow in the opposite direction. Outside air is drawn into the bellows through one or more inlet pipes 15' each containing a spring-seated ball valve 16', these inlet pipes extending between a manifold 14' and the interior of the bellows.

The pump just described operates in substantially the same manner as the pump illustrated in Figs. 1 and 2, except that the fresh air drawn into the bellows by way of the manifold 14' is expelled through the vents 24 and the constricted open end of the tubes 23, instead of through vents upon the impact face of the breaker plate.

The lower ends of the tubes 23 will normally be embedded in the main body of dough occupying the bottom of the mixing chamber, and as the pump is actuated by impact therewith by detached portions of dough carried around by the agitator bars, air is forced into the dough so as to thoroughly aerate and cool the same.

Obviously the invention is capable of embodiment in other forms than those described above which are to be regarded as exemplary rather than as restrictive of the invention. By the term "dough" is meant not only baker's dough but any plastic material which lends itself to use in the manner described above. Instead of untreated air, any other fluid may be used as the medium to be incorporated into the dough; or air containing selected gases, liquids or solids in suspension capable of imparting a distinctive flavor or aroma to the dough may be employed.

I claim:

1. The combination with a mixer including a receptacle for containing a mass of plastic material and an agitator rotatable within said receptacle, of an aerating pump located adjacent the path of rotation of the agitator and operable by impact therewith of plastic material adhering to the agitator.

2. The combination with a mixer including a receptacle for containing a mass of plastic material and an agitator rotatable within the receptacle, of an aerating pump located adjacent the path of rotation of the agitator and operable by impact therewith of plastic material adhering to the agitator, said pump having its inlet communicating with the outside of the receptacle and its outlet communicating with the inside of the receptacle, for drawing outside air into the receptacle.

3. The combination with a mixer including a receptacle for containing a mass of plastic material and an agitator rotatable within the receptacle, of an aerating pump located adjacent the path of rotation of the agitator and operable by impact therewith of plastic material adhering to the agitator, said pump having vents so arranged as to expel air into the plastic material in the receptacle.

4. The combination with a mixer including a receptacle for containing a mass of plastic material and an agitator rotatable within the receptacle, of a movable breaker plate located adjacent the path of rotation of the agitator and adapted to be actuated by impact therewith of plastic material adhering to the agitator, said breaker plate forming the movable part of an aerating pump, and vents associated with said pump so arranged as to expel air into the plastic material in the receptacle.

5. The combination with a mixer including a receptacle for containing a mass of plastic material and an agitator rotatable within the receptacle, of a movable breaker plate located adjacent the path of rotation of the agitator and adapted to be actuated by impact therewith of plastic material adhering to the agitator, said breaker plate forming the movable part of an aerating pump arranged for drawing outside air into the receptacle and expelling it into the plastic material in the receptacle.

6. The combination with a mixer including a receptacle for containing a mass of plastic material and an agitator rotatable within the receptacle, of a movable breaker plate located adjacent the path of rotation of the agitator and adapted to be actuated by impact therewith of plastic material adhering to the agitator, a bellows operable by said breaker plate, and vents for expelling air from said bellows into the dough.

7. The combination with a mixer including a receptacle for containing a mass of plastic material and an agitator rotatable within the receptacle, of a movable breaker plate located adjacent the path of rotation of the agitator and adapted to be actuated by impact therewith of plastic material adhering to the agitator, a bellows operable by said breaker plate, and vents opening through the impact face of the breaker plate for injecting air into the dough overlying breaker plate.

8. The combination with a mixer including a receptacle and an agitator rotatable within the receptacle, of a movable breaker plate located adjacent the path of rotation of the agitator and adapted to be actuated by impact therewith of plastic material adhering to the agitator, a bellows operable by said breaker plate, vents opening through the impact face of the breaker plate, valves associated with said vents to permit the expulsion but to prevent the entry of air therethrough, an inlet pipe extending from externally of the receptacle into the bellows and a valve for permitting the inflow but preventing the outflow of air through said inlet pipe.

9. The combination with a mixer including a receptacle for containing a mass of plastic material and an agitator rotatable within the receptacle, of an aerating pump located on that wall of the receptacle toward which the agitator in its downward movement rotates, said pump being operable by impact therewith of plastic material adhering to the agitator, an inlet for said pump extending from outside the receptacle and means for venting air from said pump into said receptacle.

10. The combination with a mixer including a receptacle for containing a mass of plastic material and an agitator rotatable within the receptacle, of an aerating pump located on that wall of the receptacle toward which the agitator in its downward movement rotates, said pump being operable by impact therewith of plastic material adhering to the agitator, an inlet for said pump extending from outside the receptacle, a manifold connected in circuit with said inlet, fibrous material within said manifold for cleansing the air passing through said inlet, and vents for permitting the expulsion of air from said pump into the receptacle.

11. The combination with a mixer including a closed receptacle for containing a mass of plastic material and an agitator rotatable within the receptacle, of an aerating pump located adjacent the path of rotation of the agitator and operable by impact therewith of plastic material adhering to the agitator, said pump being so constructed and arranged as to deliver outside air into the receptacle and a valve controlling the escape of air from said receptacle and so adjusted as to maintain a pressure greater than atmospheric pressure within the receptacle.

12. The combination with a mixer including a receptacle for containing a mass of plastic material and an agitator rotatable within the receptacle, of an aerating pump located adjacent the path of rotation of the agitator and operable by impact therewith of plastic material adhering to the agitator, a tube connected to said pump and extending to a position adjacent the bottom of the receptacle so as to be embedded in the plastic material reposing therein, said tube having a vent for discharging air into the plastic material.

13. The combination with a mixer including a receptacle for containing a mass of plastic material and an agitator rotatable within the receptacle, of an aerating pump located adjacent the path of rotation of the agitator and operable by impact therewith of plastic material adhering to the agitator, a plurality of tubes connected to said pump and extending to a position adjacent the bottom of the receptacle so as to be embedded in the plastic material reposing therein, said tubes being perforated for a portion of their length to provide vents for discharging air into the plastic material.

14. The combination with a mixer including a receptacle for containing a mass of plastic material and an agitator rotatable within said receptacle, of a plate extending alongside the inner face of the receptacle and adjacent the path of rotation of the agitator, and means yieldingly supporting said plate so as to permit said plate to absorb the impact therewith of the plastic material adhering to the agitator.

15. The combination with a mixer including a receptacle for containing a mass of plastic material and an agitator rotatable within said receptacle, of a breaker element extending alongside the inner face of the receptacle and adjacent the path of rotation of the agitator, and yieldable means associated with said breaker element allowing said breaker element to yield and absorb the impact of the plastic material adhering to and carried around by the agitator.

EUGENE H. PURDY.